(12) United States Patent
Brunn et al.

(10) Patent No.: US 11,182,693 B2
(45) Date of Patent: *Nov. 23, 2021

(54) COMPOSABLE NATURAL LANGUAGE LENSES FOR COLLABORATIVE STREAMS

(71) Applicant: International Business Machines Corporation, Armonk, NY (US)

(72) Inventors: Jonathan F. Brunn, Logan, UT (US); Scott E. Chapman, Goffstown, NH (US); Dennis J. Chen, Wellesley, MA (US); Ami H. Dewar, Durham, NC (US); Rachael M. Dickens, Raleigh, NC (US); Jonathan Dunne, Dungarvan (IE); Ethan A. Geyer, Mebane, NC (US); Rogelio Vazquez-Rivera, Acton, MA (US)

(73) Assignee: International Business Machines Corporation, Armonk, NY (US)

( * ) Notice: Subject to any disclaimer, the term of this patent is extended or adjusted under 35 U.S.C. 154(b) by 1067 days.

This patent is subject to a terminal disclaimer.

(21) Appl. No.: 15/791,352

(22) Filed: Oct. 23, 2017

(65) Prior Publication Data

US 2019/0122142 A1    Apr. 25, 2019

(51) Int. Cl.
| | |
|---|---|
| *G06N 20/00* | (2019.01) |
| *G06F 40/35* | (2020.01) |
| *G06F 40/117* | (2020.01) |
| *H04L 29/08* | (2006.01) |
| *H04L 29/06* | (2006.01) |
| *G06N 20/20* | (2019.01) |

(52) U.S. Cl.
CPC ........... *G06N 20/00* (2019.01); *G06F 40/117* (2020.01); *G06F 40/35* (2020.01); *G06N 20/20* (2019.01); *H04L 65/403* (2013.01); *H04L 67/12* (2013.01)

(58) Field of Classification Search
CPC ................................ G06N 20/00; H04L 67/12
See application file for complete search history.

(56) References Cited

U.S. PATENT DOCUMENTS

| | | | |
|---|---|---|---|
| 7,680,890 B1 | 3/2010 | Lin | |
| 7,756,851 B2* | 7/2010 | Brooks | G06F 16/335 707/711 |
| 8,873,836 B1* | 10/2014 | Dietrich | G06K 9/00973 382/155 |
| 9,165,329 B2* | 10/2015 | Beechum | G06Q 50/01 |

(Continued)

OTHER PUBLICATIONS

Caruana et al., "Ensemble Selection from Libraries of Models", 2004, ICML 2004, pp. 1-9. (Year: 2004).*

(Continued)

*Primary Examiner* — Paulinho E Smith
(74) *Attorney, Agent, or Firm* — Anthony V.S. England; L Jeffrey Kelly; Susan M. Maze

(57) ABSTRACT

Identification of content classes deemed important by users is received. Classifiers are trained on user communication text to recognize content matching content classes. A composite classifier is applied to text of communication among users of a second set of users, including tagging, by the composite classifier, content in text of communication among the users of the second set. The tagging is responsive to the classifiers recognizing their respective content classes in text of communication among the users of the second set.

16 Claims, 8 Drawing Sheets

(56) References Cited

U.S. PATENT DOCUMENTS

| | | | | |
|---|---|---|---|---|
| 10,417,340 | B2* | 9/2019 | Applegate | G06F 16/345 |
| 10,541,822 | B2* | 1/2020 | Brunn | G06Q 10/04 |
| 10,785,185 | B2* | 9/2020 | Vennam | H04L 51/22 |
| 2007/0174408 | A1* | 7/2007 | Paul | G06Q 10/107 709/207 |
| 2014/0079314 | A1* | 3/2014 | Yakubovich | G06K 9/6227 382/159 |
| 2014/0114895 | A1* | 4/2014 | Beechum | G06Q 50/01 706/46 |
| 2016/0132788 | A1 | 5/2016 | Li et al. | |
| 2016/0260023 | A1* | 9/2016 | Miserendino, Jr. | G06N 20/00 |
| 2018/0285731 | A1* | 10/2018 | Heifets | G06K 9/6256 |
| 2018/0344242 | A1* | 12/2018 | Ben-Kiki | G10L 25/63 |
| 2019/0075141 | A1* | 3/2019 | Albouyeh | H04L 43/08 |
| 2019/0103982 | A1* | 4/2019 | Brunn | H04L 12/1822 |
| 2019/0121852 | A1* | 4/2019 | Applegate | G06F 40/284 |
| 2019/0122142 | A1* | 4/2019 | Brunn | G06N 20/00 |
| 2019/0279110 | A1* | 9/2019 | Brunn | G06F 40/117 |

OTHER PUBLICATIONS

Ramachandran et al., "Mining Chat Conversations: The Next Frontier", 2011, FLAIRS Conference 2011, pp. 1-2 (Year: 2011).*

List of IBM Patents or Patent Applications Treated as Related.

Jonathan F. Brunn, et al. "Composable Natural Language Lenses for Collaborative Streams," U.S. Appl. No. 16/409,804, filed May 11, 2019.

Statement Regarding Prior Disclosures by the Inventor or a Joint Inventor.

Grace Period Disclosure: IBM, "IBM Watson Workspace & Work Services," presented to the public at IBM World of Watson Conference 2016 from Oct. 24-27, 2016.

Grace Period Disclosure: IBM, "Watson Work Services," presented to the public at IBM World of Watson Conference 2016 from Oct. 24-27, 2016.

Grace Period Disclosure: IBM, "Toscana—One Pager," presented to the public at IBM World of Watson Conference 2016 from Oct. 24-27, 2016.

IBM, "IBM World of Watson 2016—Welcome," https://www-304.ibm.com/events/tools/wow/2016ems, regarding IBM World of Watson Conference 2016 from Oct. 24-27, 2016, downloaded Oct. 23, 2017.

IBM, "Watson Workspace Help Center, Using Workspace, Understanding moments,"https://help.workspace.ibm.com/hc/en-US/articles/229753508-Understanding-moments, published Oct. 24, 2016, downloaded Oct. 23, 2017.

Slack Digest, https://web.archive.org/web/20161004210209/http://slackdigest.com, Oct. 4, 2016, retrieved on Oct. 25, 2017.

Slack Digest Notification Functions, https://web.archive.org/web/20160405091623/https://get.slack.help/hc/en-US/articles/201649273-Email-notifications, Apr. 5, 2016, retrieved on Oct. 25, 2017.

Durham, Jonathan S., "Topic detection in online chat," Naval Postgraduate School, Sep. 2009, https://calhoun.nps.edu/handle/10945/4513.

Sood, Arpit, et al., "Topic-Focused Summarization of Chat Conversations," Conference: Proceedings of the 35th European conference on Advances in Information Retrieval, Mar. 2013.

Uthus, David C., et al., "Plans Toward Automated Chat Summarization," Proceedings of the Workshop on Automatic Summarization for Different Genres, Media, and Languages, pp. 1-7, Portland, Oregon, Jun. 23, 2011.

Crammer, Koby, "Online Passive-Aggressive Algorithms," Journal of Machine Learning Research 7 (2006) 551-585 Submitted May 2005; Published Mar. 2006.

Ramachandran, Sowmya, et al., "Mining Chat Conversations: The Next Frontier," Association for the Advancement of Artificial Intelligence (www.aaai.org). As part of 88ABW-2010-6038, Nov. 15, 2010.

Escalante, Hugo Jair, et al., "Sexual predator detection in chats with chained classifiers," Proceedings of the 4th Workshop on Computational Approaches to Subjectivity, Sentiment and Social Media Analysis, pp. 46-54, Atlanta, Georgia, Jun. 14, 2013.

The PaperBot, https://web.archive.org/web/20160819143448/http://thepaperbot.io, Aug. 19, 2016.

* cited by examiner

COMPOSABLE NATURAL LANGUAGE LENSES FOR COLLABORATIVE STREAMS

BACKGROUND

Collaboration tools are a popular form of information technology and typically support various kinds of user conversations, such as persistent chat, for example. Persistent chat applications enable users to create topic-based discussion rooms in which messages and files are posted both for real time conversations and as permanent records for browsing or searching.

SUMMARY

In an embodiment of the present invention, a computer system implemented method includes receiving identification of a first content class deemed to be important by a user of a first set of one or more users and training a first classifier to recognize content matching the first content class, where the training is on text of communication among the one or more users. The method further includes receiving identification of a second content class deemed to be important by a user of the first set of one or more users and training a second classifier to recognize content matching the second content class, where the training is on text of communication among the one or more users. A composite classifier is provided, where the composite classifier includes the first and second classifiers. The composite classifier is applied to text of communication among one or more users of a second set of one or more users. Applying the composite classifier to text of communication among the one or more users of the second set includes tagging, by the composite classifier, content in text of communication among the one or more users of the second set, where the tagging is responsive to the first and second classifiers recognizing their respective content classes in text of communication among the one or more users of the second set.

In other embodiments of the invention, other forms are provided, including a system and a computer program product.

BRIEF DESCRIPTION OF THE DRAWINGS

Novel features believed characteristic of the invention are set forth in the appended claims. The invention itself, however, as well as a preferred mode of use, objectives and advantages thereof, will best be understood by reference to the following detailed description of an illustrative embodiment when read in conjunction with the accompanying drawings, wherein:

DETAILED DESCRIPTION

Figure 1:
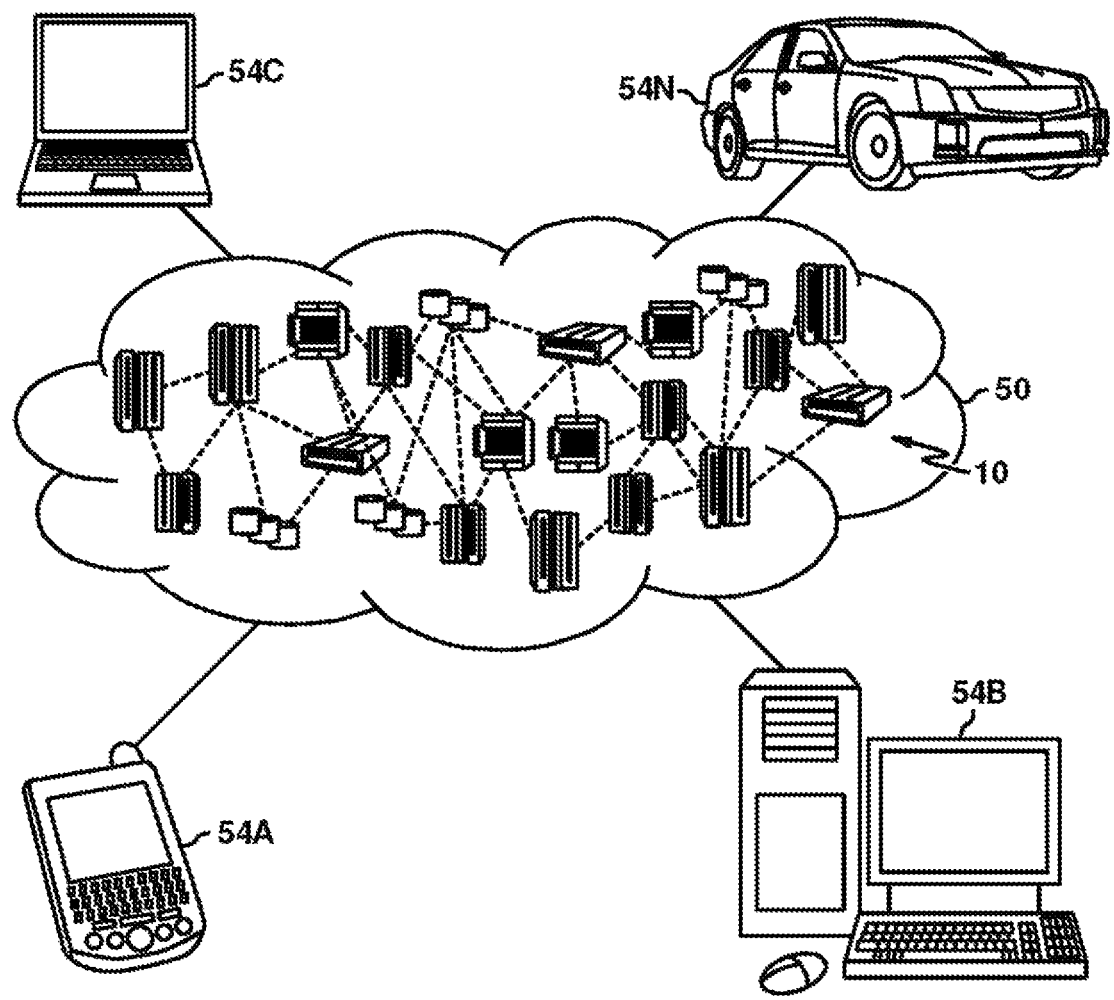
FIG. 1 depicts a cloud computing environment according to embodiments of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and Reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
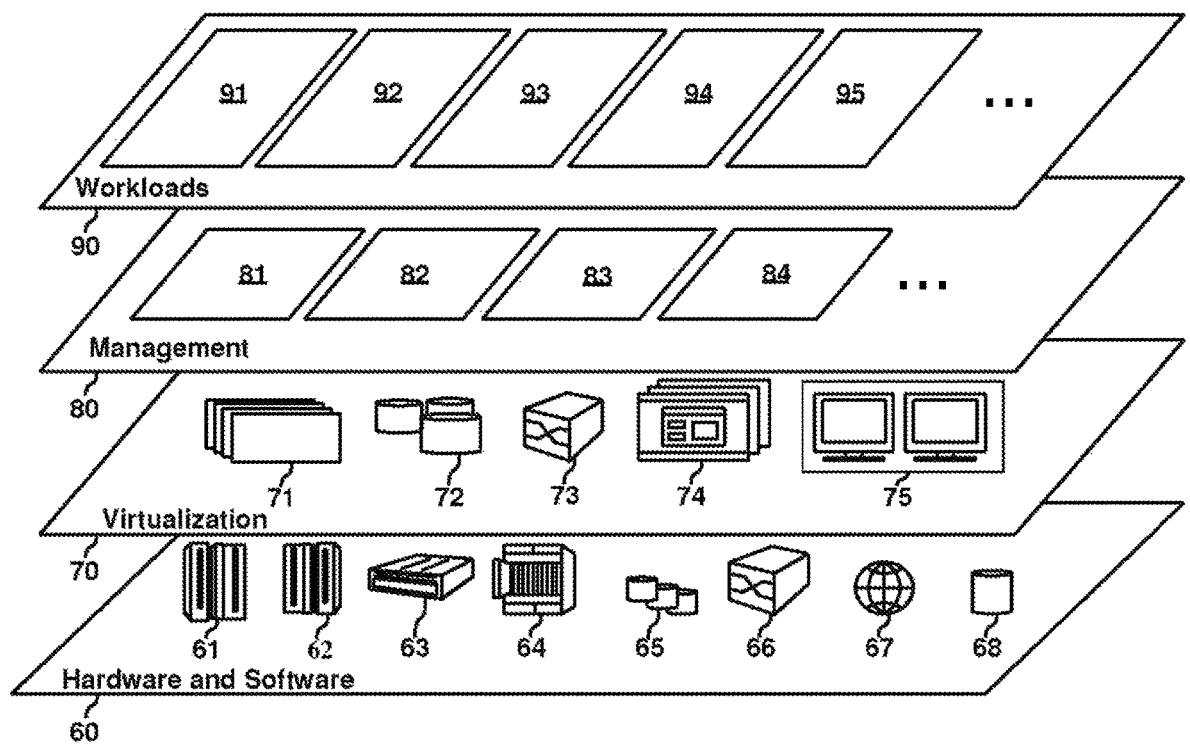
FIG. 2 depicts abstraction model layers, according to embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; and transaction processing 95. The communication analysis and attention management described herein may be included in data analytics processing 94 or transaction processing or both, for example.

In developing embodiments of the present invention, there has been a recognition that it is challenging to keep up with or catch up on information generated in natural language conversations supported by collaboration tools. As a metaphor for information that slips past and doesn't get the attention it needs in persistent chat situations, one team uses the term "missed chocolates," which is a reference to a famous scene from a television show "I Love Lucy," in which chocolates on a conveyor belt speed by Lucy and Ethyl.

In this context, which has been described as "an all-day meeting with no agenda," it can become hard for users to know where to focus their attention, given that in each conversation there are different dimensions of importance to different people and different teams. Especially in persistent chat situations, a user may feel an increased need to be constantly available to monitor, react and shape conversations. Sometimes this becomes such a burden that users simply abandon participation.

Figure 3A:
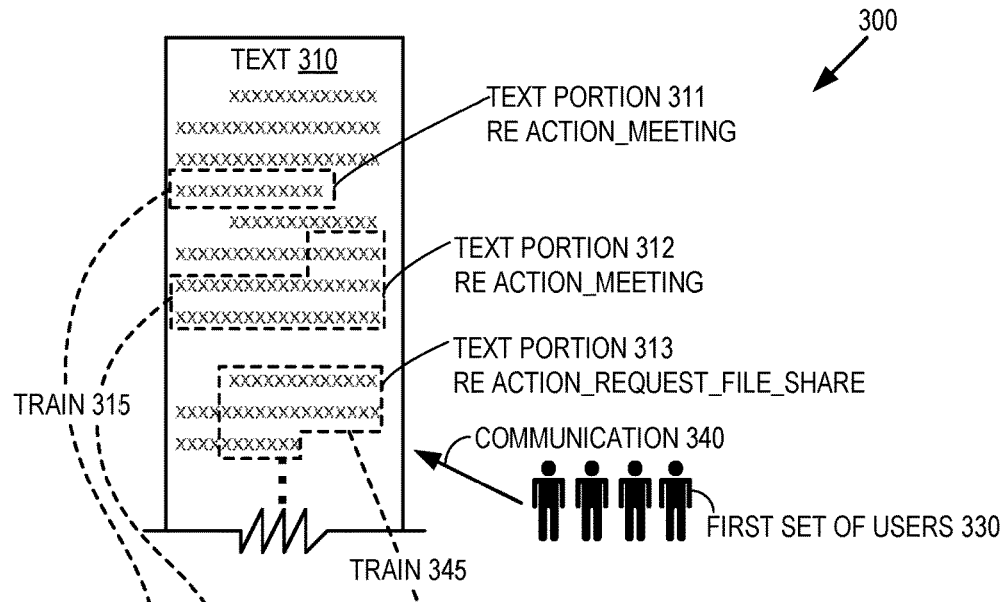
FIGS. 3A and 3B illustrate aspects of a system for attention management and communication analysis, along with actions performed by system, according to embodiments of the present invention.
Figure 3A:
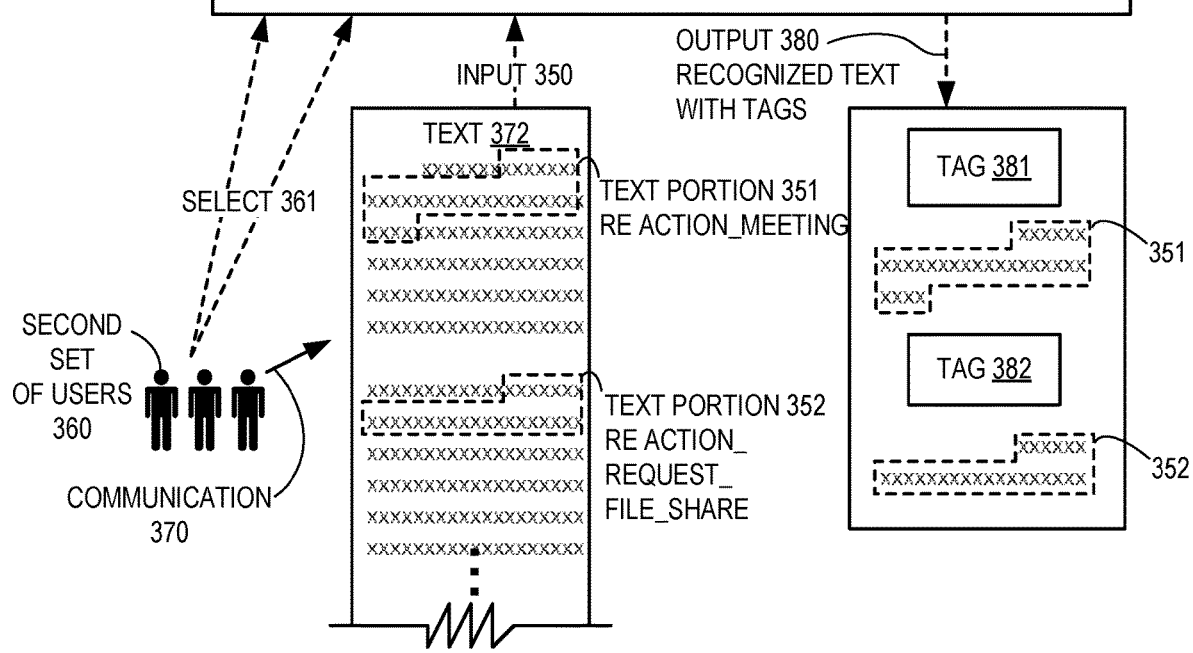
Figure 3B:
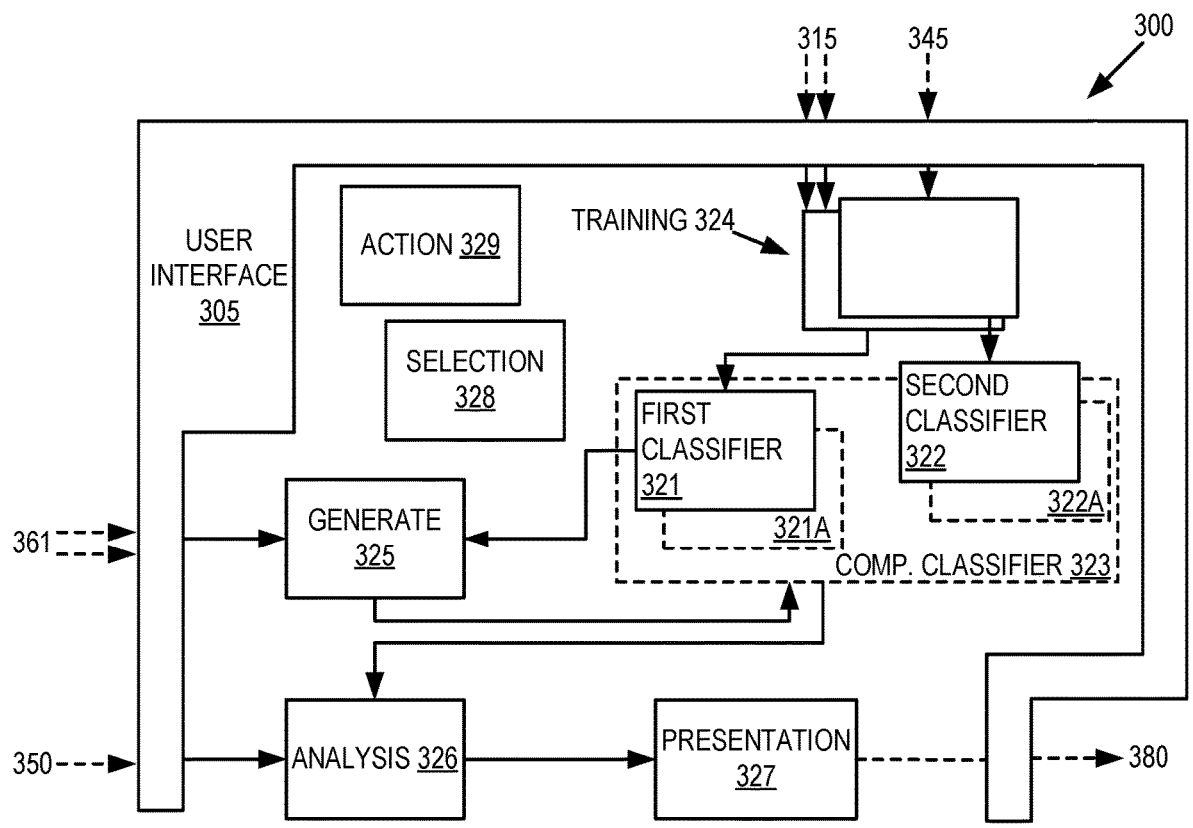

Referring to FIGS. 3A and 3B, a system 300 is illustrated along with actions performed by system 300, according to an embodiment of the present invention, wherein machine learning classifiers, such as first classifier 321, second classifier 322, etc., are provided as building blocks for performing conversation analysis (or, more broadly, communication analysis) and attention management services, wherein re-use of classifiers speeds deployment of the services, according to one or more embodiments of the present invention. A commercially available way of classifying text may be used for the classifiers, such as classifiers of the Watson Natural Language Classifier service offered by International Business Machines Corporation. In the illustrated instance, for example, first classifier 321 receives 315 text portion(s) 311 and 312 for training, where a first set 330 of users has selected portion(s) 311 and 312 from text 310 of their communication(s) 340. Likewise, second classifier 322 receives 345 text portion(s) 313 for training, where the set 330 of users selected portion(s) 313 from text 310 of the communication(s) 340.

Once trained on a class, each classifier performs analysis, wherein an analysis module 326 applies the classifier to the text of a conversation, i.e., the classifier uses its configuration to determine whether sentences of the conversation match the class according to a user specified confidence level (also referred to as a "degree of confidence" or "% confidence"), which is a well-known statistical measure. In the illustrated example of FIGS. 3A and 3B, analysis module 326 applies instances 321A and 322A of classifiers 321 and 322 to text 372 of communication 370 of users 360 and thereby determines that portions 351 and 352 match respective classes corresponding to classifications 321A and 322A and assigned respective tags 381 and 382. For instances where the confidence level is 0.95, for example, and the classifier has determined the text of a conversation matches, i.e., belongs to, the class for which the classifier is trained, this indicates that the classifier has determined that the classification is correct with an estimated certainty of at least 95% based on statistical analysis of the text. As previously stated, a classifier such as the Watson Natural Language Classifier may be applied in this manner. For this classifier, the confidence level may be input by the user prior to applying the classifier to the text of a conversation. (The Watson Natural Language Classifier is commercially available from International Business Machines Corporation.)

Training module(s) 324 train machine learning classifiers 321 and 322 to identify dimensions of conversations among a predetermined group of users, e.g., communication(s) 340 of first set 330 of users, in one or more embodiments of the present invention, where each dimension concerns an aspect of a conversation that is particularly meaningful for the users in the group. Correspondingly, training module(s) 324 train respective sets of classifiers for respective user groups. (The user group may be a team. Consequently, the terms "team" and "user group" are used interchangeably herein, as are the terms "team member" and "user," although it should be understood that the present invention may be applied to communication other than communication of teams and is, therefore not limited to teams in its application.) The users in the group may be predetermined. That is, the group may be an identified set of users. From the foregoing, it should be appreciated that for a set of classifiers applied to conversations of a team, an instance of those classifiers is solely assigned to, and associated with, the team.

Examples of a user group include a product or service development team, a product or service support team, sales team, executive management team, etc.

Typically, one or more team members select classifiers and assign them to conversations of their own team, although it is possible for the team member(s) to assign classifiers to the conversations of others, of course. In any event, each classifier instance that is assigned to analyze conversations of a user group/team is associated with the user group/team. Although solely assigned to a team, existing classifiers selected for a user group/team may be selected from among ones that have already been trained. That is, respective existing classifiers selected for a team may be selected from among classifiers that have been trained on conversations of respectively different teams; or they may be selected from among classifiers that have all been trained on conversations of a single team; or one or more may be selected from among classifiers that have been trained on conversations of one team, one or more may be selected from among classifiers that have been trained on conversations of another team, etc.

In one or more embodiments of the present invention, a module of a software application, such as a generation module 325, receives selections of classifiers to apply and receives assignments of the selected classifiers to user groups. In the illustrated instance, for example, second set 360 of users selects 361 classifiers 321 and 322 to apply to text 372 of their communication(s) 370. In response to such a selection, the generation module 325 automatically generates new instances of the selected, trained classifiers for re-use in the new application, for example, new instances 321A and 322A in the illustrated example. By deploying new instances of these pre-trained classifiers, services may be immediately provided for a new group of users, without first training the selected, re-used classifiers specifically on conversations of the new user group. Even if selected, re-used classifiers are trained on conversations of the new user group before applying the trained classifiers to the new user group, the training time is at least reduced, since the selected classifiers have already been trained on one or more other user groups prior to being deployed for the new user group. Training time is also reduced or eliminated due to the particular, pre-trained classifiers that are selected for the new user group and the ways described herein in which the selection module 328 selects the classifiers. In any event, even if the selected, re-used classifiers for the new user group are immediately deployed without training on any conversations of the new user group, and even if the performance of the re-used classifiers is adequate without additional training for the new user group, performance of the re-used classifiers may also subsequently improve over time through additional training on conversations of the new user group.

In FIG. 3A, composite classifier 323 analyzes communication(s) 370 of users 360, e.g., text 372. Before, during or after the time when classifiers are analyzing conversations of a user group, a user may create new classifiers for the conversations. In one way of doing this, generation module 325 generates a new classifier in response to a user action that directs the module 325 to generate the new classifier based on one or more instances of a tag that one or more users apply to selected part(s) of text the user(s) compose in the conversation(s). Users may apply tags in well-known ways during live conversation(s) when the user(s) read through logs of already recorded conversations. For example, in FIG. 4 user 430 of user set 360 tags 420 text portion 411 of text 372. For example, when a user, e.g., user 430, reads the text of an already recorded conversation, e.g., text 372, the user may select and tag a portion of the text, e.g., portion 411, in a well-known way.

Figure 4:
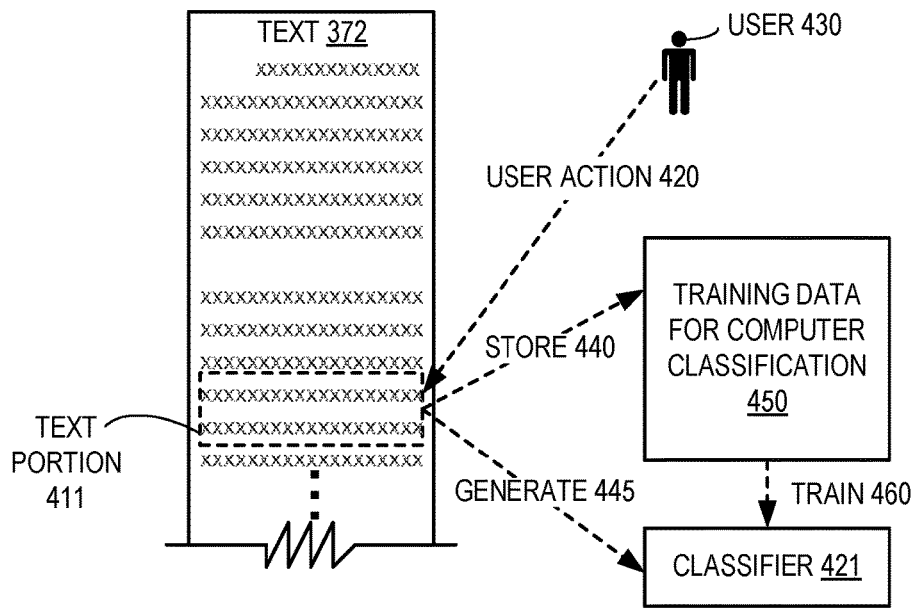
FIG. 4 illustrates generating a new classifier for tagged text portions responsive to user tagging and a request for generating a corresponding classifier, according to embodiments of the present invention.

In FIG. 3A, the text portions 311, 312, and 313 may have been selected and tagged by one or more of the users 330, i.e., in a fashion as depicted in FIG. 4. A user interface 305 is provided in one or more embodiments of the present invention, such as shown in FIG. 3B, where user interface 305 is configured to provide commands for the user to tag the selected portion of text in a well-known way and direct generation module 325 to respond to the tag by generating a new classifier corresponding to the tag. FIG. 4 illustrates generating 445 new classifier 421 for tagged 420 text portion 411 responsive to user tagging and a request for generating a corresponding classifier. That is, a generation module, such as module 325 in FIG. 3B, assigns the tag as a class name for the new classifier and for text portions that the classifier is trained to recognize, such as portion 411. User interface 305 is also configured to respond to the user causing the generation of a new classifier, wherein user interface 305 points training module(s) 324 to the selected, tagged 420 portion of text 411 to store 440 text 411 with any other similarly tagged data to use as training data 450 for the new classifier 421 and train 460 on the stored 440 data 450, so that the new classifier will recognize text like that of the selected, tagged portion of text. User interface 305 is configured to provide choices for the user to indicate whether training should be done incrementally and automatically in direct response to the user tagging, or whether, alternatively, the training may be deferred for more user tagging or other actions. Accordingly, user interface 305 is configured to provide a command for initiating training later.

A classifier has a class name that corresponds to the class of text that a classifier is trained and assigned to identify. Users may select 361 a set (referred to herein as a "lens" or "composite classifier") of suitable classifiers based at least partly on these classes, where the set of classifiers is for re-use in analyzing the text of conversations of the user's group/team. That is, by selecting 361, one or more team members 360 compose a lens 323, where the lens 323 may be a unique combination of new or existing classifiers, e.g., first existing classifier 321 and second existing classifier 322 are selected 361 for re-use as classifiers 321A and 322A for a composite classifier 323 (i.e., a "lens") in the illustrated instance. In any event, lens 323 becomes uniquely trained 460 for the new team. Further, the classifiers 321A and 322A of the lens 323 may also be individually or collectively used as a building block for another lens, just as classifiers 321 and 322 have been used as building blocks for lens 323 in the illustrated instance.

Sentences, phrases or both that are presented due to identification by a classifier or composite classifier are referred to as "focuses." Executing a lens may identify and present a set of one or more sentences, where each such sentence may be referred to herein as a "focus." For example, a software analysis module 326 applies the preconfigured classifiers of a lens to the text of a whole conversation, sentence by sentence, message by message, or message block by message block, to find a matching set of sentences for focuses. In a conversation for which there is a sufficient degree or extent of matching, the matching sentences may be designated as focuses. (In some embodiments of the present invention, executing a lens may, instead, identify and present a set of phrases as focuses. In some embodiments, executing a lens may identify and present a set of sentences and phrases as focuses. Consequently, it should be understood that references herein to identifying "sentences" as focuses may include identifying phrases as focuses, or may include identifying both sentences and phrases as focuses.)

As previously stated, a classifier is for classifying text included in a conversation, for example, i.e., identifying whether or not the conversation includes a text portion that matches the class that the classifier is trained to identify. Since a lens has more than one classifier, the lens may classify text portions in categories according to the respective classifiers of the lens. Further, the lens may also classify in a higher, more generic category, i.e., the classification level of an overall class defined by the lens.

In an example, the respective classes of a lens and its classifiers have respective class names. (Herein, a classifier and the class of the classifier may be considered synonymous for some purposes, so that a reference herein to a classifier is considered to be a reference to its class, and vice versa.) In one naming convention, the name of a classifier may include the class name of its lens concatenated with one or more subclass names. This provides a path-like convention, wherein the names of classifiers/classes indicate the lens to which they belong and contribute. For example, text portion 311 in FIG. 3A is tagged 351 "action_meeting" because it belongs to the "action" class, were the action is further limited to an action about a meeting. Text portion 312 is tagged 352 "action_request_file_share" because it belongs to the "action" class, where the action is limited to a requested action and the requested action concerns a file, where the required action for the file is to share the file.

To further illustrate, respective classifiers of an action lens are trained to identify the following classes in one instance:
Action,
Action_HRticket_open
Action_meeting,
Action_file_create, and
Action_file_share Analysis module 326 calls the classifiers of the Action lens and gets the following results by applying the classifiers to the text of a conversation:
Action, 90% confidence
Action_HRticket_open, 55% confidence
Action_file_create, 80% confidence
Action_file_share, 85% confidence In this example, a minimum 75% threshold degree of confidence is applied as the criterion that determines whether analyzed text matches a class. (This degree of confidence is user selectable.) Action_hr_ticket has a level of confidence, i.e., degree of confidence that is less than the threshold degree of 75%, so analysis module 326 responsively deems the text as NOT matching this class. However, the most general, "Action" classifier indicates, by a confidence level greater than the threshold 75%, that the text matches the "Action" class, so analysis module 326 identifies the text as fitting into the "Action" class.

Two of the classifiers in this example lens are configured to identify classes that overlap in two aspects, but that differ in a final aspect. That is, the Action_file_create and Action_file_share classifiers both are configured to identify classes that include an "action" class and a "file" subclass, but one of them identifies a "share" sub-subclass, which may be a type of action in this instance, while the other identifies a "create" sub-subclass, which may also be a type of action. Analysis module 326 concludes that these two classifiers of the Action lens indicate that the analyzed text matches their respective Action_file_create and Action_file_share classes, since their respective % confidences are greater than the threshold 75%. However, analysis module 326 concludes the classification at this sub-subclass level of detail is ambiguous, in one or more embodiments of the present invention, since the sub-subclasses are different but each of their classifiers indicate that the text matches them with confidence greater than the threshold. Therefore, analysis module 326 indicates that the text matches merely an Action_file subclass, which omits the sub-subclasses. In this particular instance, this indicates to the user that action described in the text concerns a file, but that there is competing evidence as to what is the indicated action, i.e., whether the action is about sharing a file or whether it is about creating a file.

Each lens may include a classifier trained to recognize an "Undecided" class in one or more embodiments of the present invention. When a lens having this classifier is applied to text and the classifier's analysis result indicates a match by the highest confidence level among all the lens's classifiers, the analysis module 326 responsively indicates that the text is deemed to not match any of the other classes, which indicates that the lens has no focuses. When this happens, it negates any classes identified by the other classifiers of the lens, regardless of their respective classifier results. It is useful to include such an Undecided classifier in a lens, because this classifier can recognize features in the text that indicate classes identified by the other classifiers are false-positive classifications. In another way of stating this, the Undecided classifier may recognize features in analyzed text that indicate the text is uninteresting, which may include recognizing that there are features in the text, known as "red herrings," that mislead other classifiers of the lens to produce false positives.

A presentation module 327 presents the results of the analysis module 326's analysis of text of the conversation. In one way of doing this, a summary view presents what is herein referred to as "moments" in the conversation, which includes presenting focuses that the analysis module 326 determines are properly identified by the one or more classifiers of the lens, where each focus is presented together with tags indicating its respective lens name and applicable classifier name(s).

Figure 5:
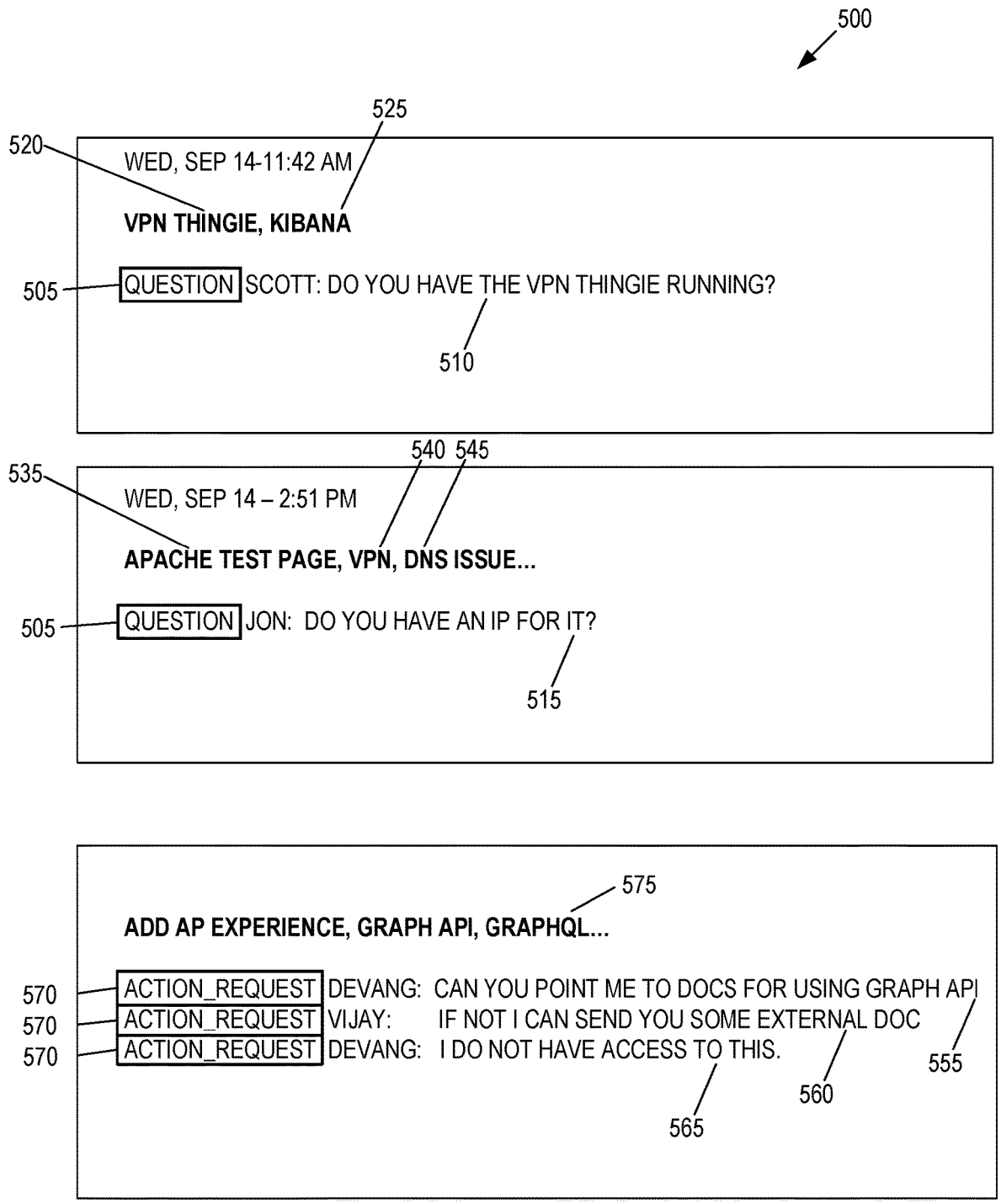
FIG. 5 illustrates an example summary view of moments resulting from application of one or more lenses trained to recognize classes including a "question" class and an "action_request" class, according to embodiments of the present invention.

FIG. 5 shows an example summary view 500 of moments resulting from application of a lens trained to recognize a "question" class and a lens trained to recognize an "action_request" class. Regarding the question class, shown in summary view 500 are portions of text that the question lens identified in the text of a conversation, where the portions are presented as two focuses 510 and 515. Regarding the action_request class, view 500 also shows portions of text that the action_request lens identified in the text of the conversations, where the portions are presented as three focuses 555, 560, and 565. In this example, each of focuses 510 and 515 in the overall summary view 500 is identified with a tag 505 labeled "Question," since the lens that produced the result shown in this example is for identifying text that has questions and, accordingly, has "Question" as the lens's class name. Likewise, in summary view 500, each of focuses 555, 560, and 565 is identified with a tag 570 labeled "action_request," since the lens that produced the result shown in this example is for identifying text that has a requested action, and, accordingly, has "action_request" as the lens's class name.

In summary view 500, focus 510 is presented with tags 520 and 525. Tag 520 is labeled "Vpn thingie," because focus 510 was identified by a classifier of the Question lens trained to recognize a subclass of questions that refer to a "Vpn thingie." Tag 525 is labeled "Kibana" because focus 510 was also identified by a classifier of the Question lens trained to recognize a subclass of questions that refer to "Kibana." Similarly, focus 515 is presented with three tags 535, 540 and 545. Tag 535 is labeled "Apache Test Page," because focus 515 was identified by a classifier of the Question 505 lens trained to recognize a class of questions about an Apache test page. Tag 540 is labeled "Vpn" because focus 515 was also identified by a classifier of the Question 505 lens trained to recognize a class of questions about Vpn's. Tag 545 is labeled "Dns issue . . . " because focus 515 was also identified by a classifier of the Question 505 lens trained to recognize a class of questions that refer to a "Dns issue." Similarly, focuses 555, 560, and 565 are presented with tags 575 in addition to tags 570.

Note that in the above example, all the classifiers for focus 510 and 515 are for identifying questions and are members of the lens for identifying questions, so the "Question" aspect of each classifier's name is omitted from tags 520, 525, 530, 535, 540 and 545 shown in summary view 500. Likewise, "action_request" is omitted from tags 575.

It should be appreciated that while the classifiers of the lens in the above example all share merely the "Question" class in common, in other instances a lens may be more specific. For example, a lens may be more specifically limited to recognizing questions that refer to a VPN, so that the classifiers of the lens are, correspondingly, more specifically trained and all share the narrower, "Question_VPN" class, not merely the broader, "Question" class.

In one or more embodiments of the present invention, an action software module 329 automatically uses the focus(es) generated from the application of a lens to perform action fulfillment steps, or at least to recommend such steps to a user. For example, action software module 329 may trigger bots, apps or web pages responsive to identifying specific text. For example, when the classifier identifies a conversation about a meeting, action module 329 may responsively generate a meeting invitation and automatically populate it with text content and attendee data that module 329 obtains from the text of the conversation. (It should be understood, of course, that identifying a conversation "about" a particular subject includes identifying that a portion of the conversation is about the particular subject and may include identifying the portion.) In another example, when the classifier identifies a conversation about job opportunities action module 329 may responsively trigger an activity flow showing job openings for job roles relevant to a user's current position. In another example, when the classifier identifies a conversation including a question about where to find a cheap hotel in Paris, action module 329 may responsively trigger a bot or other application to show a summary list of such hotels or may trigger a web page that provides a way to find such hotels, such as a search engine page of the TripAdvisor website or a "Places to Stay" page for Paris at a website such as the TripAdvisor website.

As was previously described, classifiers may be assigned by a user for application to conversations of a particular user group/team, so that a set of classifiers is associated with the team in one or more embodiments of the present invention. As was also previously described, classifiers may have already been trained when deployed for a team, possibly on conversations of a different team, but may be further trained after the classifiers have been assigned to the team, regardless of whether the classifiers were previously trained. This is particularly useful since it tends to further improve performance of a classifier to train it on conversations of the team to which the classifier is assigned.

A user interface, such as user interface 328 in FIG. 3B, is provided to enable users to direct training module(s) 324 to training data, particularly including the user group's conversations. One way of doing this was described herein above and illustrated in FIG. 4, wherein a user selects a portion 411 of text 372 in a conversation, performs user action 420 to add a tag to the selected portion 411 of text 372, and directs training module(s) 324 to use the selected, tagged portion of text as at least part of its training data 450. In another way of directing training, training module(s) 324 may train a team's classifiers automatically based on other activities of team members in connection with the team's conversations. In one such way, when a team member user action 420 clicks on a focus in a summary 500, the presentation module 327 responsively presents to the user the conversation that contains the focus that the user clicked on. (This user action may be referred to herein as a "click-through.") A user may configure training module(s) 324 via user interface 305 for click-through-initiated training of the user group's classifiers, wherein the group's click-throughs cause training module(s) 324 to train classifiers for the user group responsive to click-throughs. When click-through-initiated training is enabled, and a user clicks through a focus to see its conversation, training module(s) 324 adds the text of the focus to the training data for retraining one or more classifiers. (The retraining may be done incrementally and automatically in direct response to a user click-through, or, alternatively, the training may be deferred for more user click-throughs or other actions.)

For the training, the user selects which classifier(s) will be retrained on the focus as training data. In one or more embodiments, each team has a set of classifiers it trains, and each focus a team member clicks through on is added as training data for every classifier of the team's set. (The team's set of classifiers may be a subset of the overall set of classifiers the team assigns to lenses.) In one or more other embodiments, when a team member clicks through on a focus, the focus is added only as training data for classifier(s) already trained on the class(es) of the focus. For a classifier of the same class as a class of the focus, the focus serves as training data for the classifier to recognize as a member of its class, whereas for a classifier of a different class than the class(es) of the focus, the focus serves as training data for the classifier to recognize as NOT a member of its class.

As previously described, a set of classifiers may be applied to conversations of a team, so that an instance of those classifiers is solely assigned to, and associated with, the team. A business enterprise is typically hierarchical, wherein a team is typically a member of a larger organization within the enterprise and the larger organization is, in turn, a member of a still larger organization within the enterprise, and so on. In order to facilitate sharing and reuse of classifiers and to facilitate selective training of higher-level shared classifiers, according to one or more embodiments of the present invention, a team set of classifiers is applied to, assigned to, and associated with conversations of a team, whereas a first organization set of classifiers is applied to, assigned to, and associated with conversations of a first organization that has the team as a member, while a second organization set of classifiers is applied to, assigned to, and associated with conversations of a larger, second organization that has the first organization as a member, and so on. Finally, a global set of classifiers also is provided that is applied to, assigned to, and associated with the entire enterprise. (In the foregoing, a "set of classifiers" may refer to classifiers organized as one or more lenses.)

Accordingly, sets of classifiers, including lenses, may be applied in hierarchical fashion, as follows. For analyzing a conversation associated with a given hierarchical level within the enterprise, the analysis module 326 looks up and applies the classifiers associated with that given hierarchical level and all classifiers associated with each hierarchical level lower than the given hierarchical level. Based on the classifier results, the analysis module 326 determines focuses to present to the user, which it does using logic such as previously described regarding threshold levels for degrees of confidence, but with at least one additional modification. If a classifier of a lower level in the hierarchy indicates a more specific class compared to a classifier of a higher level, the analysis module 326 discards, i.e., does not present in the summary view, the focus from the less specific, classifier associated with the higher level of the hierarchy and, instead, presents the focus from more specific classifier associated with the lower level of the hierarchy.

A user may change confidence thresholds described herein, which determine what text identified by classifiers is included in a summary view. This is particularly useful when results produced for a summary lack enough detail to produce focuses of interest. By lowering thresholds, a user may generate and view focuses that classifiers would otherwise deem non-matching. This addition of less selectively generated focuses presents more context to the users, while still limiting text that is included in summary views. This may facilitate a ground truth for the user that clarifies otherwise ambiguous classifications.

In one aspect of an embodiment of the present invention, focus text may be run through de-identification or other automated cleaning tasks to remove potentially sensitive information or specific reference to entities before being added to the training set. This de-identification can include custom language models (as in Watson Knowledge Studio models applied to Alchemy Entity Extraction).

In one aspect of an embodiment of the present invention, a recommender module (not shown) recommends useful lenses and classifiers based on abilities of the lenses and classifiers as demonstrated by classifying in previous interactions with conversations. For instance, if high confidence predictions from a certain classifier have high enough recall, precision or F scores with respect to "interesting" messages, then the classifier (and hence lens) is recommended, where "interestingness" may be determined in a variety of ways, including by past user interactions with messages in a channel, wherein users reacted to messages such as with language clues of agreement, likes, +1s, and emoji's in following messages. Note that emphasis here in recommending a classifier is on precision, that is, classifiers which correctly identify some set of the interesting messages for the team. Lenses with low recall scores may sometimes be recommended, since a composite of multiple, potentially overlapping lenses can increase recall.

Figure 6:
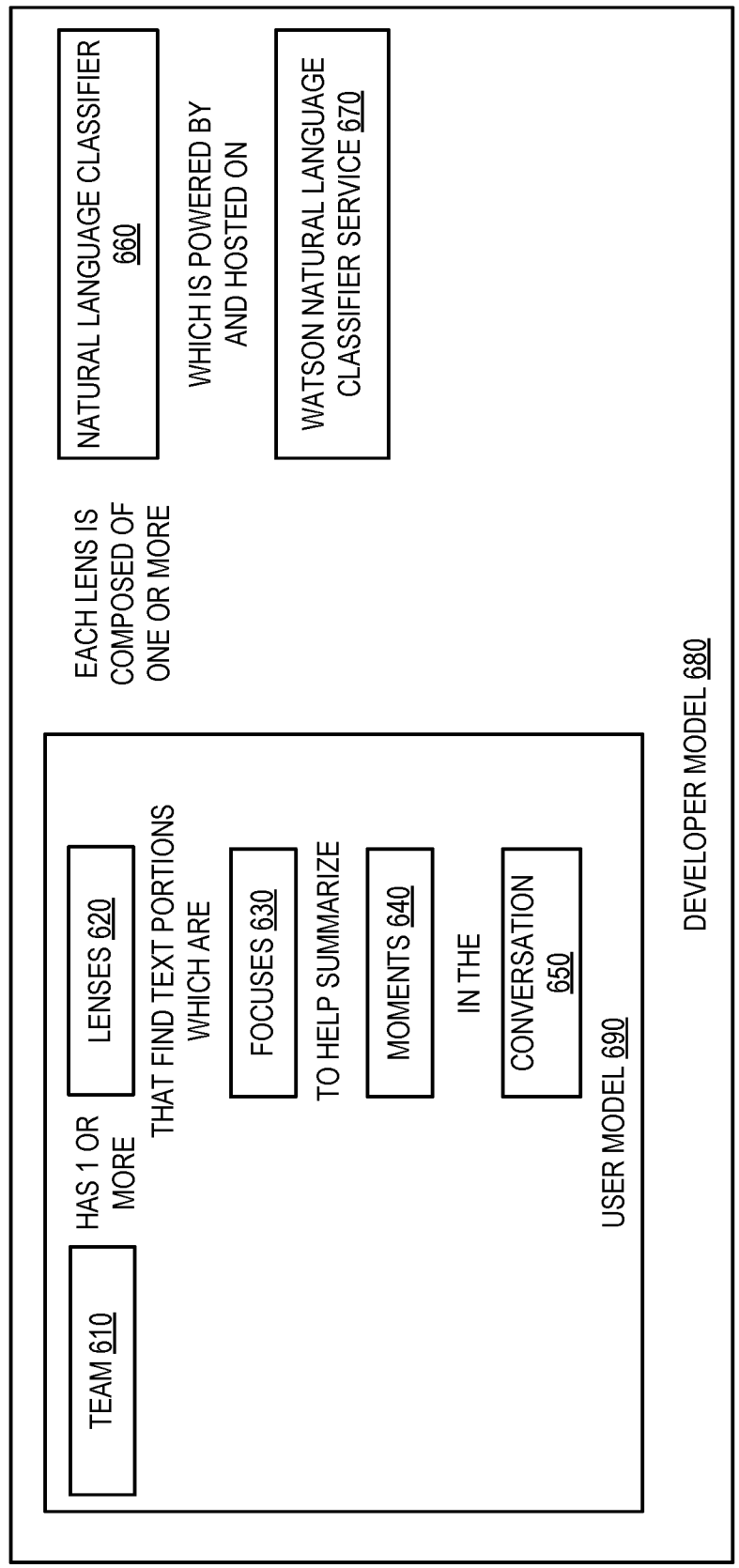
FIG. 6 illustrates a developer model and a user model, according to embodiments of the present invention.

Referring now to FIG. 6, a developer model 680 and user model 690 are illustrated, according to an embodiment of the present invention. User model 690 includes actions by users, wherein a team 610 of users composes one or more lenses 620 to find text portions, which are focuses 630, in a communication, e.g., conversation 650. Finding the focuses 630 helps summarize significant moments 640 in conversation 650. In developer model 680, a developer provides a natural language classifier 660, instances of which may be trained and applied by the users. In an embodiment of the present invention, such a classifier 660 is powered by and hosted on the commercially available, Watson Natural Language Classifier Service 670 of International Business Machines Corporation.

Figure 7:
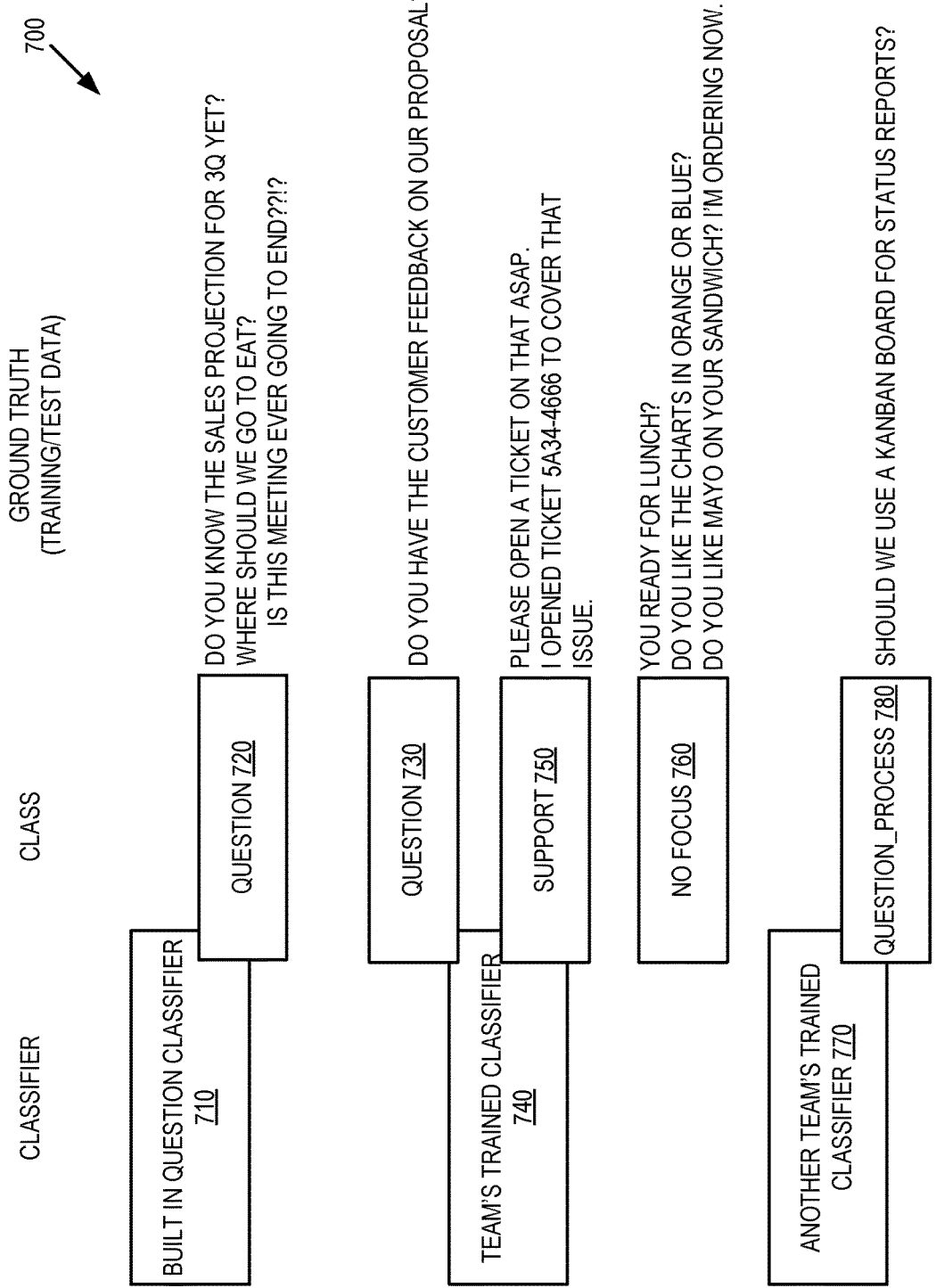
FIG. 7 illustrates examples of classifiers in a context, according to embodiments of the present invention.

Referring now to FIG. 7, examples of classifiers 710, 740 and 770 are illustrated in a context, according to an embodiment of the present invention. Classifier 710 is a built-in classifier of a developer model, such as model 680 (FIG. 6), where classifier 710 is trained to recognize portions of a communication that are a question class 720. Classifier 740 is an instance of a classifier including sub-classifiers that a team has trained to recognize a class 730 that is questions of business significance, a class 760 that is questions having no business significance and a class 750 that is support issues. Classifier 770 is an instance of a classifier that another team has trained to recognize a class 780 that is questions regarding a particular business process. Beside each class 720, 730, 750, 760 and 780 are text portions used for training the respective classifiers of each class 720, 730, 750, 760 and 780.

Figure 8:
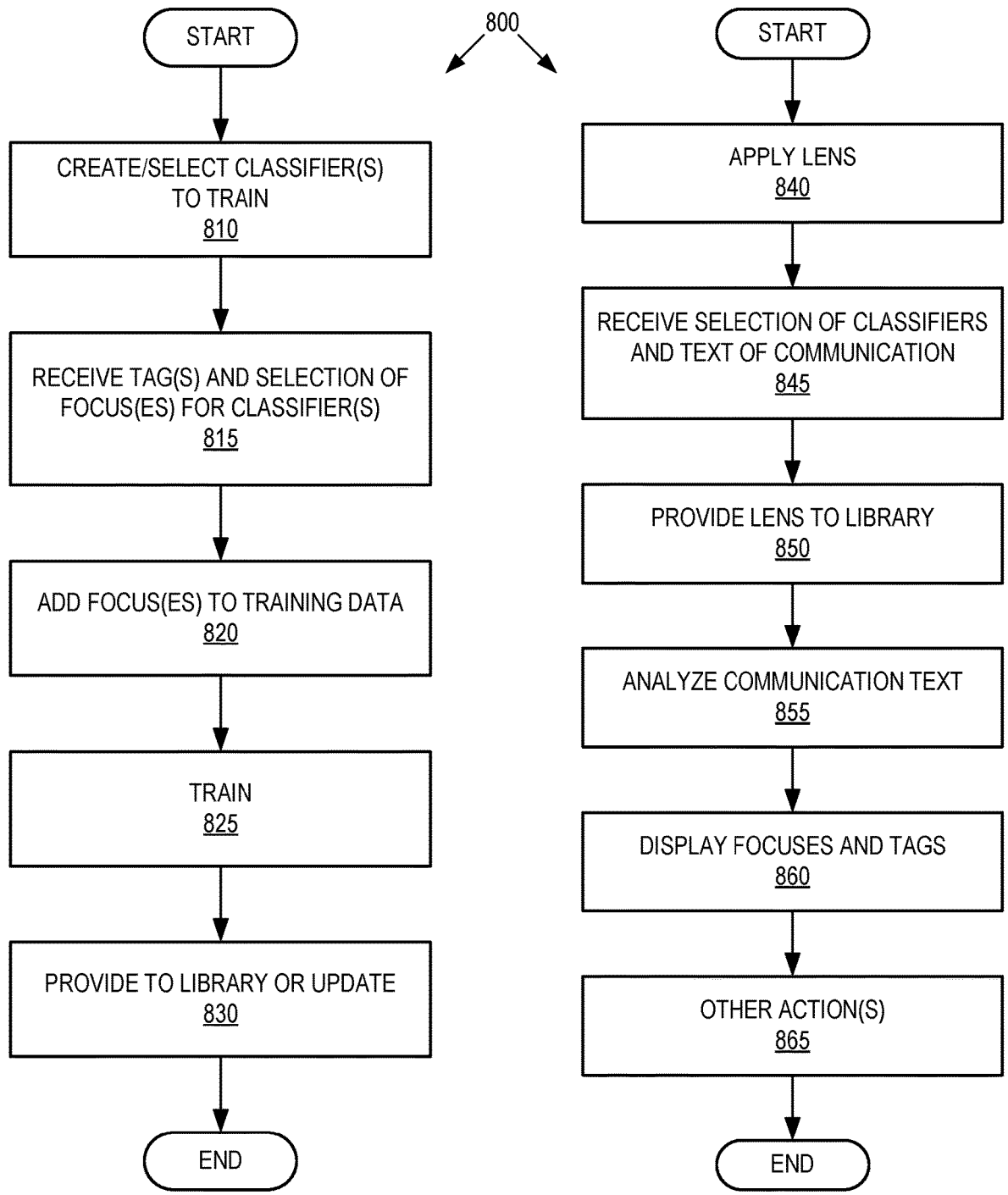
FIG. 8 illustrates a computer implemented process of analyzing communication and managing attention, according to embodiments of the present invention.

Referring now to FIG. 8, a computer implemented process 800 of analyzing communication and managing attention are illustrated in a flow chart, according to an embodiment of the present invention. At 810, process 800 receives a requested action via a user interface and performs the action, where action 810 indicates for process 800 to create a classifier or to select an existing classifier. For example, a first set of users requests action 810 and, in response, process 800 creates a first classifier. Then, at 815, process 800 receives another requested action via the user interface and performs the action for training the classifier(s) identified in action 810. In action 815, process 800 receives tag(s) and selected text portion(s) that correspond to the tag(s). (Such a text portion may be referred to herein as a "focus." The focus may be text from communication among the one or more users.) For example, in action 815, process 800 receives selected text portion and a corresponding tag identifying a first content class deemed to be important by a user of a first set of one or more users, which is for training the first classifier to recognize the first content class. That is, instances that are like the received text portion will be deemed to match the tag, which identifies the first content class.

Then, at 820, process 800 receives a request to add, and responsively adds, the received focus(es) to training data for the classifier(s) identified in action 810. Then, at 825, process 800 receives a request to train the classifier and responsively trains it on the training data. Then, at 830, process 800 receives a request to provide the trained classifier to a library, where the classifier is stored, or to update the classifier if it has already been stored, which process 800 responsively does. This makes the classifier available to other users for training and application. Actions 810 through 830 may be repeated for a second classifier, a third classifier, and so on.

A classifier weighting model can be derived to infer the weighting between the first and subsequent classifiers. The results are used to predict how much content is required from a subsequent classifier content class. A personalized classifier cost function can be derived to based on first classifier content class data. The result is used to minimize the input from a secondary classifier content class for improved real-time outputs. Thus, training may determine weighting between the first and second classifiers, and determining content input for the second classifier content class may be based on the weighting, so that input required for the second classifier content class tends to be minimized.

At 840, process 800 receives a requested action via a user interface for process 800 to apply a lens, which includes more than one classifier. For example, another set of users requests action 840 and process 800 responsively creates a first lens. At 845, process 800 receives selection of classifiers for the new lens and text of communication to which the lens is to be applied. For example, a first and second classifier trained and stored in actions 810-830 may be selected at 845 for the lens. At 850, process 800 provides the lens to the library, so that it can also be trained and applied by others. At 855, process 800 causes the classifiers of the lens to analyze the text as described herein in order to determine whether it includes any text portions that match the classes for which classifiers have been trained. At 860, process 800 presents matching text portion(s), i.e., focus(es), and corresponding tag(s). At 865, process 800 performs other actions, such as, for example, actions described herein above as performed by action module 329 (FIG. 3A).

A matrix of lenses can be aggregated as a collection that can then provide additional insight into a team's conversation. A lens collection can be categorized based on different criteria such as business type. Thus, a second composite classifier may be applied to text of communication among the one or more users of the second set of one or more users described in connection with FIG. 3A along with the applying of the first composite classifier, where the first and second composite classifiers provide an aggregate classification.

It should be appreciated that the aspect of process 800 for analyzing 855 may include determining not to display a certain kind of certain kinds of text portions due to determining a preemptive condition exists in connection with the matching of those text portions. That is, as described herein above, when process 800 determines via analysis 855 that one text portion matches one subclass and another text portion matches another subclass but also determines the subclasses are at least somewhat contradictory, as in the example presented herein above regarding the subclasses action_file_create and action_file_share, as focuses the text portions for action_file_create and action_file_share. Likewise, as described herein above, when a lens has an undecided class and process 800 determines via analysis 855 that text portion(s) of the communication under analysis belong to the undecided class, then the displaying 860 aspect of process 800 may preempt presentation of any text portions for which other classifiers of the lens indicate a match.

In one or more embodiments, the label of the composite classifier is defined by the label of the first classifier, unless the second classifier identifies a label which negates the label of the first classifier. Thus, the composite classifier tagging may include tagging content recognized by the first and second classifiers with at least a tag of the content class of the composite classifier, where the tag of the content class of the composite classifier corresponds to a tag for the content class of the first classifier, unless the content class of the second classifier negates the content class of the first classifier.

In one or more embodiments, the label of the composite classifier is defined by the most specific label provided by the first or second classifier. Thus, the composite classifier tagging may include tagging content recognized by the first and second classifiers with at least a tag of the content class of the composite classifier, where the tag of the content class of the composite classifier corresponds to a tag for a most specific one of the content classes of the first and second classifiers.

In one or more embodiments, the label of the composite classifier is defined by the label of the label of the first classifier, unless the second classifier identifies a more specific label. Thus, the composite classifier tagging may include tagging content recognized by the first and second classifiers with at least a tag of the content class of the composite classifier, where the tag of the content class of the composite classifier corresponds to a tag for the content class of the first classifier, unless the content class of the second classifier is for a more specific content class.

In one or more embodiments, labels among the classifiers are defined in a hierarchy. Further, the label of the composite classifier is defined by the most specific label in the hierarchy which contains the labels of the first and second classifier. Thus, the second classifier may be for a subclass of the content class of the first classifier, so that the second classifier is for a more specific content class than the first classifier, and the composite classifier tagging may include tagging content recognized by the first and second classifiers with at least a tag of the content class of the composite classifier, where the tag of the content class of the composite classifier corresponds to a tag for the content class of the second classifier; and tagging content recognized by the first classifier but not the second classifier with at least a tag of the content class of the composite classifier, where the tag of the content class of the composite classifier corresponds to a tag for the content class of the first classifier.

It should be appreciated from the foregoing that what is disclosed herein provides numerous advantages, including the following:

Individual building blocks may be trained in one conversation and easily reused in another. By using multiple classifiers organized into lenses, classifiers trained from different, uncoordinated sources can be immediately deployed in a very selective way.

Different sources of training data may be used to train specific subcases or subtopics of interestingness, which come together to predict interesting actions, decisions, questions, or other interesting cases for each team.

New dimensions of interestingness can easily be trained by the team through conversation tagging/highlighting (and then shared with similar teams), resulting in the training of language classifiers. This may lead, for example, to a classifier recognizing when someone is talking about a service failure for a cloud service, when someone is talking about an open problem report, help desk ticket or a sales opportunity, etc.

Re-used classifiers may predict current interesting messages in a new team, because of their training in other contexts, such as for conversations of other teams. Such re-used classifiers may also predict future interesting messages in the new team, although the classifiers have no direct training for the new team.

It should be appreciated from the foregoing that the technical features of the invention disclosed herein provide improvements to the functions and capabilities of a computer. For example, new dimensions of interestingness can easily be trained by the team through conversation tagging/highlighting (and then shared with similar teams), resulting in the training of language classifiers. This may lead, for example, to a classifier recognizing when someone is talking about a service failure for a cloud service, when someone is talking about an open problem report, help desk ticket or a sales opportunity, etc., which is a specific benefit over conventional computer technology.

Further, technical features of the invention solve technical problems rooted in computer technology to overcome a problem specifically arising in the realm of computer networks. For example, according to embodiments of the present invention:

Individual building blocks may be trained in one conversation and easily reused in another. By using multiple classifiers organized into lenses, classifiers trained from different, uncoordinated sources can be immediately deployed in a very selective way Different sources of training data may be used to train specific subcases or subtopics of interestingness, which come together to predict interesting actions, decisions, questions, or other interesting cases for each team Re-used classifiers may predict current interesting messages in a new team, because of their training in other contexts, such as for conversations of other teams. Such re-used classifiers may also predict future interesting messages in the new team, although the classifiers have no direct training for the new team.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

One or more databases may be included in a host for storing and providing access to data for the various implementations. One skilled in the art will also appreciate that, for security reasons, any databases, systems, or components of the present invention may include any combination of databases or components at a single location or at multiple locations, wherein each database or system includes any of various suitable security features, such as firewalls, access codes, encryption, de-encryption and the like.

The database may be any type of database, such as relational, hierarchical, object-oriented, and/or the like. A database product that may be used to implement the databases is IBM® DB2®, or other available database products. (IBM and DB2 are trademarks of International Business Machines Corporation, registered in many jurisdictions worldwide.) The database may be organized in any suitable manner, including as data tables or lookup tables.

Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a key field in each of the manufacturer and retailer data tables. A key field partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

The host may provide a suitable website or other internet-based graphical user interface accessible by users. In one embodiment, Netscape web server, IBM® Websphere® Internet tools suite, an IBM DB2, universal database platform and a Sybase database platform are used in conjunction with a Sun Solaris operating system platform. (IBM and WebSphere are trademarks of International Business Machines Corporation, registered in many jurisdictions worldwide.) Additionally, components such as JBDC drivers, IBM connection pooling and IBM MQ series connection methods may be used to provide data access to several sources. The term webpage as it is used herein is not meant to limit the type of documents and application modules that might be used to interact with the user. For example, a typical website might include, in addition to standard HTML documents, various forms, Java applets, Javascript, active server pages (ASP), Java Server Pages (JSP), common gateway interface scripts (CGI), extensible markup language (XML), dynamic HTML, cascading style sheets (CSS), helper application modules, plug-ins, and the like.

While this specification contains many specifics, these should not be construed as limitations on the scope of the invention or of what can be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable sub combination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

From the foregoing, it should be appreciated that embodiments of the present invention provide numerous advantageous features. For example, embodiments of the present invention provide for monitoring of communications in a social networking system to associate terms, such as words and phrases, with a sentiment and a level of expression of the sentiment by readers of the communications to form a predictive sentiment level model. Embodiments of the present invention provide for analyzing a construction of a current communication prepared by a sender to send to one or more recipients according to the predictive sentiment level model to form a current sentiment assessment. Embodiments of the present invention provide for analyzing the current sentiment assessment against a predicted negative sentiment threshold. Embodiments of the present invention enable performing a first modification of a first message portion to facilitate a positive sentiment for the modified message responsive to identifying that a negative sentiment for a first recipient exceeds a threshold. The identifying may be accomplished, in part, by sending the first message portion to the first recipient before sending the modified message to other recipients. A second message portion may, likewise, be sent to an early recipient for identifying sentiment before sending the final message, where the sending of the second message portion may be to the same, first recipient or to a different one of the message recipients.

Those skilled in the art having read this disclosure will recognize that changes and modifications may be made to the embodiments without departing from the scope of the present invention. It should be appreciated that operation of features described herein may be turned on or off by the sender.

It should be appreciated that the particular implementations shown and described herein are illustrative of the invention and its best mode and are not intended to otherwise limit the scope of the present invention in any way. Other variations are within the scope of the following claims.

The actions recited in the claims can be performed in a different order and still achieve desirable results. Likewise, the processes depicted in the accompanying figures do not necessarily require the particular order shown, or sequential order, to achieve desirable results. In certain implementations, multitasking and parallel processing can be advantageous.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims.

As used herein, the terms comprises, comprising, or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as essential or critical.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Herein the term "multi-recipient" is used. It should be understood that this may refer to merely two recipients in one instance and more than two in another instance.

The corresponding structures, materials, acts, and equivalents of all means or step plus function elements in the claims below are intended to include any structure, material, or act for performing the function in combination with other claimed elements as specifically claimed.

Many modifications and variations will be apparent to those of ordinary skill in the art without departing from the scope and spirit of the invention. The embodiments presented herein were chosen and described in order to best explain the principles of the invention and the practical application and to enable others of ordinary skill in the art to understand the invention for various embodiments with various modifications as are suited to the particular use contemplated. The description of the present invention has been presented for purposes of illustration and description, but is not intended to be exhaustive or limited to the invention in the form disclosed.

What is claimed is:

1. A system comprising:
   a processor; and
   a computer readable storage medium connected to the processor, where the computer readable storage medium has recorded thereon a program for controlling the processor, and where the processor is operative with the program to execute the program for:
   receiving identification of a first content class deemed to be important by a user of a first set of one or more users and training a first classifier to recognize content matching the first content class, where the training is on text of communication among the one or more users;
   receiving identification of a second content class deemed to be important by a user of the first set of one or more users and training a second classifier to recognize content matching the second content class, where the training is on text of communication among the one or more users;
   providing a composite classifier, where the composite classifier includes the first and second classifiers; and
   applying the composite classifier to text of communication among one or more users of a second set of one or more users, where applying the composite classifier to text of communication among the one or more users of the second set includes tagging, by the composite classifier, content in text of communication among the one or more users of the second set, where the tagging is for text of communication among the one or more users of the second set and in an instance where the second classifier is for a subclass of the content class of the first classifier, so that the second classifier is for a more specific content class than the first classifier, the composite classifier tagging includes:
- tagging content recognized by the first classifier but not the second classifier with at least a first tag of the content class of the composite classifier, where the first tag of the content class of the composite classifier corresponds to a tag for the content class of the first classifier; and
- tagging content recognized by the first and second classifiers with at least a second tag of the content class of the composite classifier, where the second tag of the content class of the composite classifier corresponds to a tag for the content class of the second classifier.

2. The system of claim 1, where the processor is operative with the program to execute the program for:
- training the composite classifier on the text of communication among the one or more users of the second set, including:
  - receiving, by a user interface action of one of the one or more users of the second set, selection of a portion of the text of communication among the one or more users of the second set; and
  - adding the portion of the text to training data for the composite classifier responsive to receiving the selection.

3. The system of claim 1, where the first content class identifies that a certain type of user response is indicated in the text of communication among the one or more users of the first set.

4. The system of claim 1, where the processor is operative with the program to execute the program for:
- providing the first and second classifiers and the composite classifier to a library for other users to include in other composite classifiers.

5. The system of claim 1, where the composite classifier tagging includes:
- tagging content recognized by the first and second classifiers with at least the first tag of the content class of the composite classifier, unless the content class of the second classifier negates the content class of the first classifier.

6. The system of claim 1, where the composite classifier tagging includes:
- tagging content recognized by the first and second classifiers with at least a tag of the content class of the composite classifier corresponding to a tag for a most specific one of the content classes of the first and second classifiers.

7. The system of claim 1, where the processor is operative with the program to execute the program for:
- determining weighting between the first and second classifiers; and
- determining content input for the second classifier content class based on the weighting, so that input required for the second classifier content class tends to be minimized.

8. The system of claim 1, where the processor is operative with the program to execute the program for:
- applying a second composite classifier to the text of communication among the one or more users of the second set of one or more users along with the applying of the first composite classifier, where the first and second composite classifiers provide an aggregate classification.

9. A computer program product, including a computer readable storage medium having instructions stored thereon for execution by a computer system, where the instructions, when executed by the computer system, cause the computer system to implement a method comprising:
- receiving identification of a first content class deemed to be important by a user of a first set of one or more users and training a first classifier to recognize content matching the first content class, where the training is on text of communication among the one or more users;
- receiving identification of a second content class deemed to be important by a user of the first set of one or more users and training a second classifier to recognize content matching the second content class, where the training is on text of communication among the one or more users;
- providing a composite classifier, where the composite classifier includes the first and second classifiers; and
- applying the composite classifier to text of communication among one or more users of a second set of one or more users, where applying the composite classifier to text of communication among the one or more users of the second set includes tagging, by the composite classifier, content in text of communication among the one or more users of the second set, where the tagging is for text of communication among the one or more users of the second set and in an instance where the second classifier is for a subclass of the content class of the first classifier, so that the second classifier is for a more specific content class than the first classifier, the composite classifier tagging includes:
- tagging content recognized by the first classifier but not the second classifier with at least a first tag of the content class of the composite classifier, where the first tag of the content class of the composite classifier corresponds to a tag for the content class of the first classifier; and
- tagging content recognized by the first and second classifiers with at least a second tag of the content class of the composite classifier, where the second tag of the content class of the composite classifier corresponds to a tag for the content class of the second classifier.

10. The computer program product of claim 9, where the instructions, when executed by the computer system, cause the computer system to implement a method comprising:
- training the composite classifier on the text of communication among the one or more users of the second set, including:
  - receiving, by a user interface action of one of the one or more users of the second set, selection of a portion of the text of communication among the one or more users of the second set; and
  - adding the portion of the text to training data for the composite classifier responsive to receiving the selection.

11. The computer program product of claim 9, where the first content class identifies that a certain type of user response is indicated in the text of communication among the one or more users of the first set.

12. The computer program product of claim 9, where the instructions, when executed by the computer system, cause the computer system to implement a method comprising:
- providing the first and second classifiers and the composite classifier to a library for other users to include in other composite classifiers.

13. The computer program product of claim 9, where the composite classifier tagging includes:

tagging content recognized by the first and second classifiers with at least the first tag of the content class of the composite classifier, unless the content class of the second classifier negates the content class of the first classifier.

14. The computer program product of claim 9, where the composite classifier tagging includes:
tagging content recognized by the first and second classifiers with at least a tag of the content class of the composite classifier corresponding to a tag for a most specific one of the content classes of the first and second classifiers.

15. The computer program product of claim 9, where the instructions, when executed by the computer system, cause the computer system to implement a method comprising:
determining weighting between the first and second classifiers; and
determining content input for the second classifier content class based on the weighting, so that input required for the second classifier content class tends to be minimized.

16. The computer program product of claim 9, where the instructions, when executed by the computer system, cause the computer system to implement a method comprising:
applying a second composite classifier to the text of communication among the one or more users of the second set of one or more users along with the applying of the first composite classifier, where the first and second composite classifiers provide an aggregate classification.

* * * * *